United States Patent [19]

Wolf

[11] 4,176,622
[45] Dec. 4, 1979

[54] FLOOR GRID FOR USE IN KEEPING ANIMALS

[75] Inventor: Johann Wolf, Scharnstein, Austria

[73] Assignee: Johann Wolf Gesellschaft m.b.H. KG, Scharnstein, Austria

[21] Appl. No.: 757,334

[22] Filed: Jan. 6, 1977

[30] Foreign Application Priority Data

Jan. 8, 1976 [AT] Austria .......................... 2807645/76

[51] Int. Cl.² .............................................. A01K 1/015
[52] U.S. Cl. ..................................................... 119/28
[58] Field of Search ...................... 119/16, 19, 20, 28; 52/177, 342, 376 (U.S. only), 660 (U.S. only), 727

[56] References Cited

U.S. PATENT DOCUMENTS

| 320,079 | 6/1885 | Martin | 52/376 |
|---|---|---|---|
| 360,452 | 4/1887 | Lansing | 119/28 |
| 1,824,210 | 9/1931 | Jacobs | 52/342 |
| 2,326,963 | 8/1943 | Morton | 52/177 |
| 3,455,279 | 7/1969 | Krevit | 119/28 |
| 3,626,904 | 12/1971 | Hatten | 119/28 |

Primary Examiner—Louis G. Mancene
Assistant Examiner—Robert P. Swiatek
Attorney, Agent, or Firm—Young & Thompson

[57] ABSTRACT

A floor grid for use in keeping animals, comprises a plurality of juxtaposed wooden bars which are transversely spaced apart to define gaps between them, and a covering on the top of each bar. The covering has downwardly depending longitudinal edge portions that extend downwardly along opposite sides of each bar, and laterally protruding portions that are integral with the downwardly depending longitudinal edge portions and that also extend downwardly along the sides of the bars. The laterally protruding portions are spaced apart along the bars to space the bars apart laterally.

12 Claims, 3 Drawing Figures

FLOOR GRID FOR USE IN KEEPING ANIMALS

BACKGROUND OF THE INVENTION

This invention relates to a floor grid for use in keeping animals, comprising juxtaposed bars, which are rectangular or slightly trapezoidal in cross-section, for use in buildings in which animals are kept and which are provided with means for removing flowable dung.

Houses for keeping animals, particularly when newly erected, are often provided with means for removing manure in a liquid state. This has the advantage that the dung is automatically or mainly automatically removed from the building. The stalls area or part thereof consists of a channel or pit, which is covered by a floor grid. Where a pit is provided, the entire sludge contained therein is pumped out over larger intervals of time. A channel extending along the stalls is arranged either at a slight gradient or provided at its end with a small elevation, which serves to retain liquid. The sludge mixture collects in the channels, which are closed at the end by a slidable shut-off gate, which is opened from time to time so that the sludge mixture flows from the channel to a collecting basin disposed outside the building. The floor grid can easily be kept clean with little effort in that it is sprayed with water from time to time.

An essential element of such installation for removing liquid manure is a floor grid, which is composed of numerous arrow bars, which are juxtaposed.

Most of the previously known floor grids are composed of concrete bars, which define gaps between them so that the dung can pass through said gaps or is forced through them by the feet of the animals. Each concrete bar has at least two portions which are enlarged in width and determine the width of the gaps.

These floor grids consisting of concrete bars have the disadvantage that their purchase cost is high, the heavy concrete bars are unwieldy and the heat conductivity is high too. The fact that the animals stand and lie on cold concrete, which is ventilated from below, may result in diseases of the animals or in a decline of their performance. Besides, the liquid manure attacks the concrete and this attack results after some time in a crumbling of the concrete and finally in a breaking of components of the floor grid. Floor grids made from plastics material or wood have similar disadvantages.

OBJECT OF THE INVENTION

It is an object of the invention to eliminate these disadvantages and to provide a floor grid which is improved from the aspect of the health of the animals and provides for a higher heat insulation and can be provided at low cost because it can mainly be made by the farmer himself and in many cases from materials which are available on the farm.

BRIEF SUMMARY OF THE INVENTION

In accordance with the invention the floor grid comprises bars which are rectangular or slightly trapezoidal in cross-section and consist of wood and are provided on top with a covering which consists of galvanized sheet steel, sheet aluminum or plastics material and which has a profiled surface and is provided at its side edges with projections, which ensure the formation of the desired gaps when the several bars are juxtaposed.

The covering is industrially prefabricated in the form of strip or rails. Because the wooden bar serve as load-carrying elements and take up the load imposed by the animals, the covering may be thin so that it requires only a small quantity of material. Coverings of galvanized sheet steel may consist of nailed plates. In this case, small spaced apart tongues are struck out from the covering to project like nails from the underside of the covering. Alternatively, these tongues may be angled and struck out upwardly so that the covering can be laid flat onto the bar and each angled tongue can be driven into the wood by means of a hammer.

The surface of the coverings is profiled and formed with elevations and depressions of any desired configuration so that the animals can stand firmly on the covering. This applies also to the design of the gaps, which are interrupted by spaced apart noses or other projections, which protrude laterally and define the width of the desired gap. This feature is particularly important because the animals might slip mainly along the gaps.

As the underside of the bar is arranged to be stressed in tension, another preferred feature of the invention resides in that the bars are reinforced also on the underside with galvanized steel strip, which preferably constitutes a nailed rail. In that case it is possible to use thinner wooden bars.

The object of the invention could not be accomplished by the provision of a floor grid consisting only of wooden bars because such floor grid would soon become worn and the animals would be highly liable to slip along the gap. When such floor grid of wood has become worn, the rough surface will render the cleaning of the floor very difficult.

For this reason the covering provided according to the invention serves to protect the wooden bars from wear and also ensures that the animals can stand firmly on the floor. When the bars are juxtaposed, the laterally protruding noses ensure that gaps having the proper width will be formed. As the bars consist of wood and are provided with a thin covering only at their surface, the floor grid remains sufficiently warm for the animals as the wooden bars are poor conductors of heat.

Details of the invention will be explained with reference to the accompanying drawing, in which some embodiments of a floor grid according to the invention are shown diagrammatically and by way of example.

DETAILED DESCRIPTION OF THE INVENTION

Figure 1:
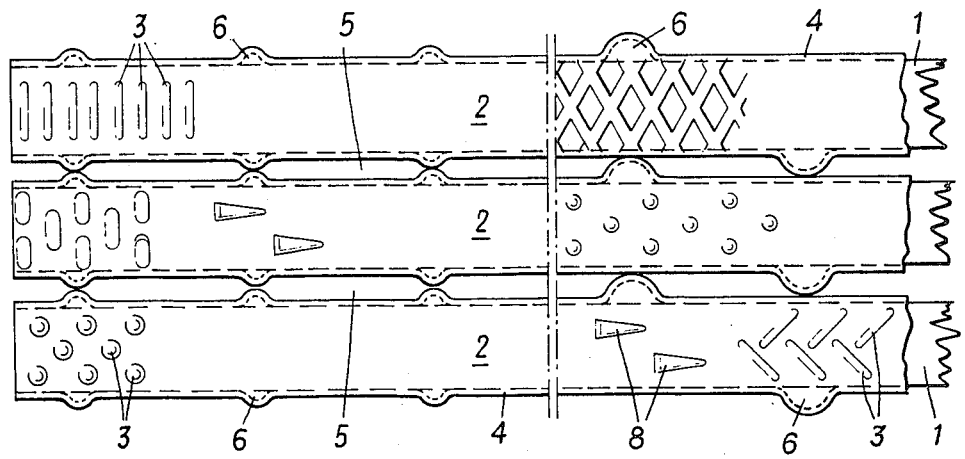
FIG. 1 is a top plan view showing a portion of a floor grid having coverings formed with different profiles.

In the embodiment shown by way of example the floor grid according to the invention comprises wooden bars 1, which are rectangular or slightly trapezoidal in cross-section, and coverings 2 which are secured to the wooden bars 1. These coverings 2 have a profiled surface 3 so that there is no risk of slippage. Various profiles may be used, as is indicated in FIG. 1. The coverings may consist of galvanized sheet steel, sheet aluminum or plastics material and may be thin and be stiffened by the provision of a depending edge portion 4. To space the wooden bars apart with formation of the gaps 5 between them, the coverings may have laterally protruding projections 6, which may either be offset from or register with those of adjacent bars. In the latter case the projections 6 protrude to one-half of the width of each gap 5.

Figure 2:
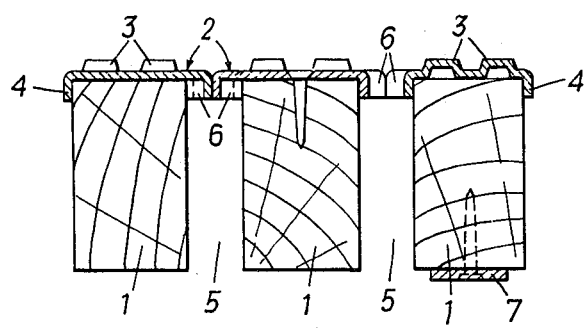
FIG. 2 is a transverse sectional view showing a floor grid.

It is indicated in FIG. 2 that a stiffening nailed rail 7 may be provided on the underside of each wooden bar 1.

Figure 3:
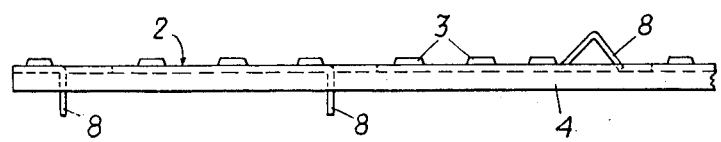
FIG. 3 is a side elevation showing a covering.

FIG. 3 is a side elevation showing a covering 2, which has been made from galvanized sheet steel and consists of a nailable plate. Punched tongues 8 which have been fully struck out, as is usual with nailable plates, are shown on the left-hand half. Such covering 2 is suitably pressed into the wooden bar 1. Tongues 8 shown in the right-hand half are angled and struck up. The covering can be placed flat on the wooden bars in direct covering contact and the tongues 8 subsequently driven into the wooden bar by means of a hammer.

What is claimed is:

1. A floor grid for use in keeping animals, which comprises
   a plurality of juxtaposed wooden bars, which are transversely spaced apart to define gaps between them, and
   a covering provided on top of each bar and having depending longitudinal edge portions that extend downwardly along opposite sides of each bar and laterally protruding portions integral with said downwardly depending longitudinal edge portions and also extending downwardly along the sides of the bars and spaced apart along the bars to space the bars apart laterally.

2. A floor grid as set forth in claim 1, in which said coverings consist of galvanized sheet steel.

3. A floor grid as set forth in claim 2, in which each of said coverings is provided with naillike tongues, which are struck out downwardly and project into the top of the associated bar.

4. A floor grid as set forth in claim 2, in which each of said coverings is provided with naillike tongues, which are right-angled and have been struck out upwardly and have subsequently been driven into the associated bar.

5. A floor covering as set forth in claim 1, in which said coverings consist of sheet aluminum.

6. A floor grid as set forth in claim 1, in which said coverings consist of plastics material.

7. A floor covering as set forth in claim 1, in which each of said coverings is provided on its underside with means by which the covering is secured to the associated bar.

8. A floor grid as set forth in claim 1, in which said laterally protruding portions of each of said coverings consist of noses, which engage adjacent coverings to define the width of said gaps.

9. A floor grid as set forth in claim 1, in which said laterally protruding portions of each of said coverings protrude by one-half of the width of said gaps and are in register with and engage said laterally protruding portions of adjacent said coverings.

10. A floor grid as set forth in claim 1, in which each of said laterally protruding portions of each of said coverings protrudes by the width of said gaps and is disposed approximately midway between two laterally protruding portions of the adjacent said covering.

11. A floor grid as set forth in claim 1, in which said covering has an upper surface formed with higher and lower portions.

12. A floor grid as set forth in claim 1, which comprises reinforcing rails which are nailed to the underside of said wooden bars.

* * * * *